United States Patent [19]

Fu et al.

[11] Patent Number: 5,451,097
[45] Date of Patent: Sep. 19, 1995

[54] BICYCLE HUB SHELL

[76] Inventors: Tain-Sheng Fu, No. 45, Lane 184, Nan-Yang Rd., Feng-Yuan City, Taichung Hsien; Gwo-Dong You, 9F, No. 83, Wu-Chuan-Hsi-San St., Taichung City; Chuen-Ku Fu, No. 74, Ssu-Yueh Rd., Tai-Ping Tsun, Hou-Li Hsiang, Taichung Hsien, all of

[21] Appl. No.: 296,235
[22] Filed: Aug. 25, 1994
[51] Int. Cl.[6] ............................................. B60B 27/00
[52] U.S. Cl. ............................... 301/110.6; 301/110.5
[58] Field of Search ................ 301/105.1, 110.5, 110.6, 301/124.2, 137; 192/46, 64

[56] References Cited

U.S. PATENT DOCUMENTS 3,131,008  4/1964  Dian ................................. 301/110.5

FOREIGN PATENT DOCUMENTS

| 429133 | 9/1911 | France | 301/105.1 |
| 0682184 | 5/1930 | France | 301/110.5 |
| 148960 | 3/1904 | Germany | 301/105.1 |
| 0013712 | 6/1913 | United Kingdom | 301/110.5 |
| 0603410 | 6/1948 | United Kingdom | 301/110.5 |

Primary Examiner—Russell D. Stormer
Attorney, Agent, or Firm—Ladas & Parry

[57] ABSTRACT

A hub shell confines an axial bore therethrough and has first and second annular mounting flanges formed integrally on an external surface thereof adjacent to first and second axial end portions of the axial bore. The hub shell is constituted by two pieces and a tubular connector that interconnects the two pieces. Each piece has an annular end portion which is formed opposite to a respective one of the first and second axial end portions and which has an annular flange that extends inwardly and radially from the periphery of the annular end portion and that abuts against the annular flange of the other piece when the first and second pieces are disposed side by side such that the axial bores are in alignment. The tubular connector is disposed entirely within the two pieces and has two outwardly and radially extending flange portions which clamp the annular flanges of the pieces so as to interconnect the latter.

3 Claims, 5 Drawing Sheets

BICYCLE HUB SHELL

BACKGROUND OF THE INVENTION

1. FIELD OF THE INVENTION

The invention relates to a hub shell, more particularly to a bicycle hub shell which comprises two separate pieces and which can bear the presence of a high twisting force applied thereto.

2. DESCRIPTION OF THE RELATED ART

FIG. 1 shows a bicycle hub unit with a conventional bicycle hub shell 1. The conventional bicycle hub shell 1 is a tubular body 1a which confines an axial bore therethrough and which has a pair of annular mounting flanges 1e that protrude respectively and radially from two axial end portions 1c (refer to FIG. 2) of the tubular body 1a for connection with a plurality of spokes (not shown). Since it is difficult to form the bicycle hub shell 1 as a one-piece body, the conventional hub shell 1 is divided into three separate parts, namely the tubular body 1a and a pair of spoke mounting units 1E with the mounting flanges 1e. As illustrated in FIG. 2, the axial end portions 1c of the tubular body 1a are connected to the spoke-mounting units 1E by means of the radially and outwardly expanding axial end portions 1c.

A drawback of the conventional hub shell 1 is that when the conventional hub shell 1 is in use, a twisting force is generated by the spokes (spokes) connected to the spoke-mounting units 1E due to friction between the wheel (not shown) and the ground. The twisting force concentrates near the connecting position 1d such that the force is easily transferred to the connecting position 1d. Since the generated twisting force is opposite to an applied force via the shaft 2 and since the spoke-mounting units 1E are not formed integrally with the tubular body 1a, the tubular body 1a may disengage untimely from the spoke-mounting units 1E and thus rotate idly in the event that the generated twisting force exceeds the bearable capacity.

SUMMARY OF THE INVENTION

The main objective of the present invention is to provide a bicycle hub shell which is constituted by two pieces, each piece being formed integrally with a spoke-mounting flange such that the hub shell can bear a great twisting force applied thereto.

Accordingly, a bicycle hub shell of the present invention confines an axial bore therethrough and has first and second annular spoke-mounting flanges formed integrally on an external surface thereof adjacent to first and second axial end portions of the axial bore. The hub shell is constituted by two pieces and a tubular connector that interconnects the two pieces. Each piece has an annular end portion which is formed opposite to a respective one of the first and second axial end portions and which has an annular flange that extends inwardly and radially from the periphery of the annular end portion and that abuts against the annular flange of the annular end portion of the other piece. The tubular connector is disposed entirely within the two pieces and has two outwardly and radially extending flange portions which clamp the annular flanges of the pieces so as to interconnect the latter.

In the disclosed embodiment, the annular flange of each of the pieces has a knurled inner surface while the tubular connector has a knurled outer surface which abuts against the knurled inner surfaces of the annular flanges of the pieces.

Since the annular spoke-mounting flanges are formed integrally with the pieces, the torque which is generated during use is disposed away from the connecting position of the pieces. Thus, the torque diminishes or reduces upon reaching the connecting position. The hub shell of the present invention can therefore bear a greater torque as compared to the conventional hub shell.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
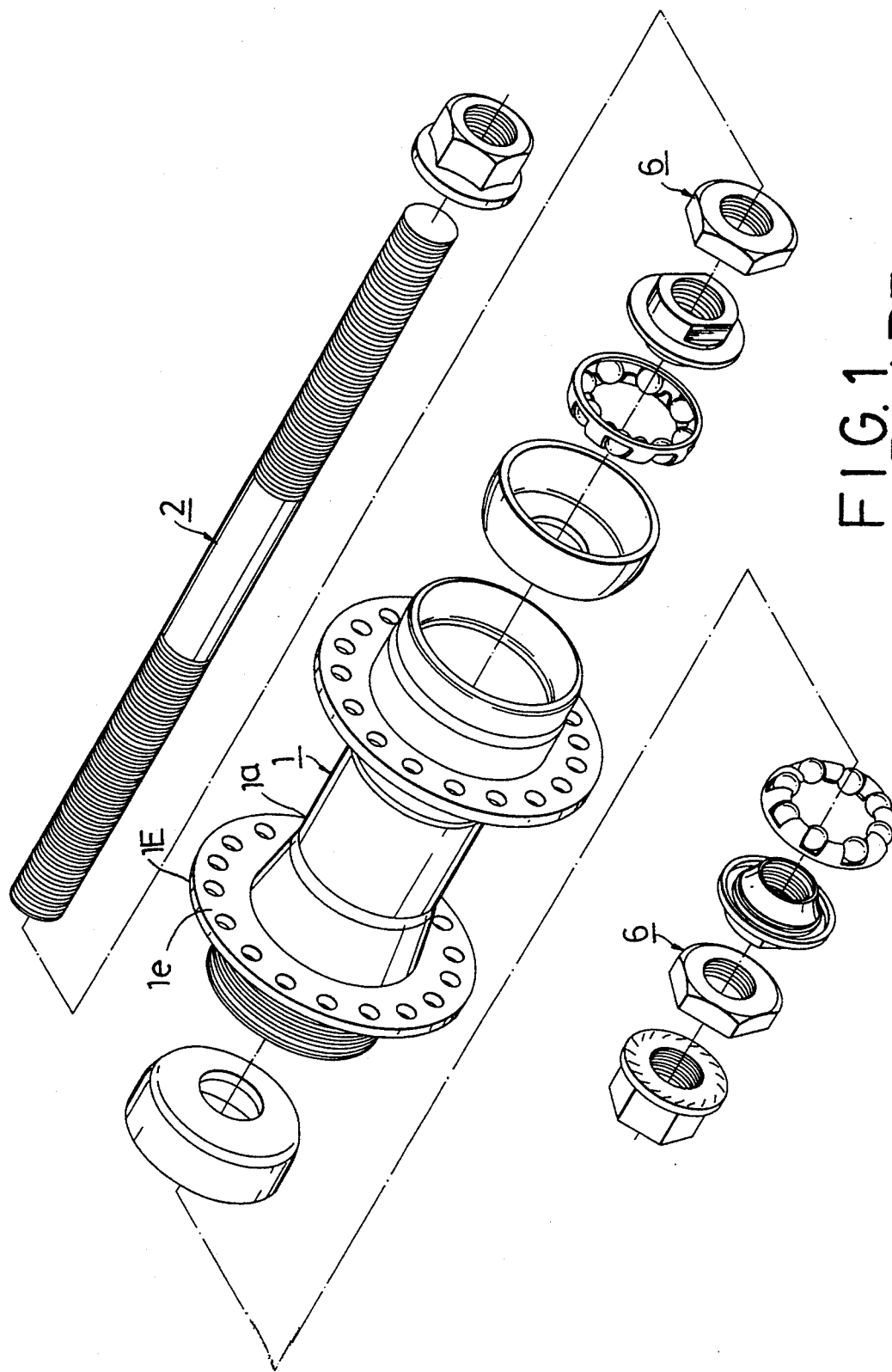
FIG. 1 shows an exploded view of a bicycle hub unit with a conventional hub shell.
Figure 2:
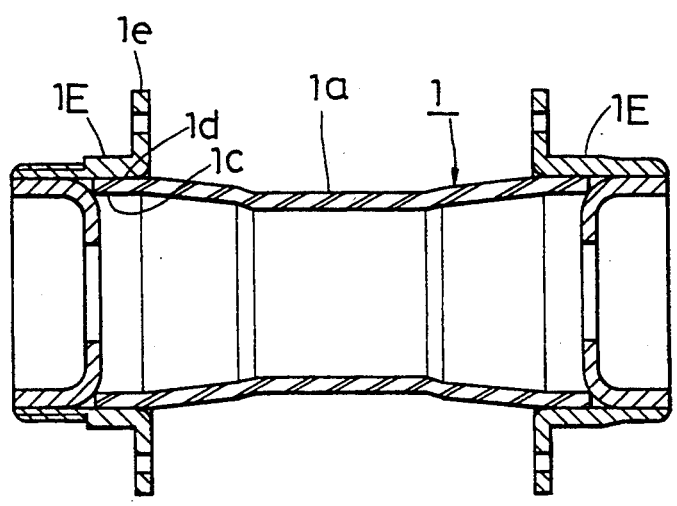
FIG. 2 shows a cross-sectional view of the conventional hub shell.
Figure 3:
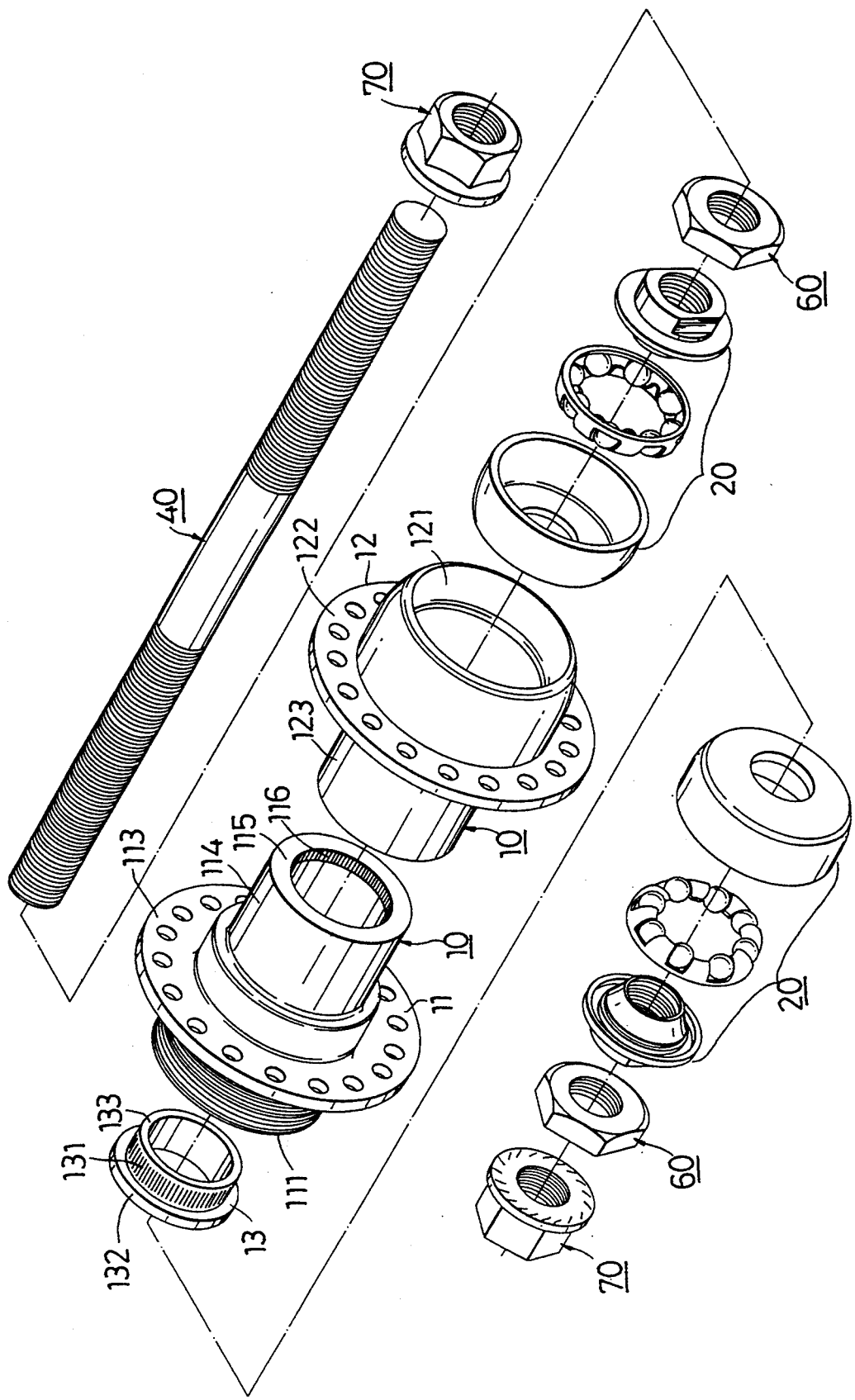
FIG. 3 illustrates an exploded view of a bicycle hub unit with a bicycle hub shell according to the present invention.

Referring to FIG. 3, a bicycle hub shell 10 and a tubular connector 13 of the present invention cooperate with a shaft 40 that is provided with two threaded end portions, a pair of bearing assemblies 20, two bearing retaining nuts 60, and a pair of locking nuts 70 to form a bicycle hub unit.

Figure 5:
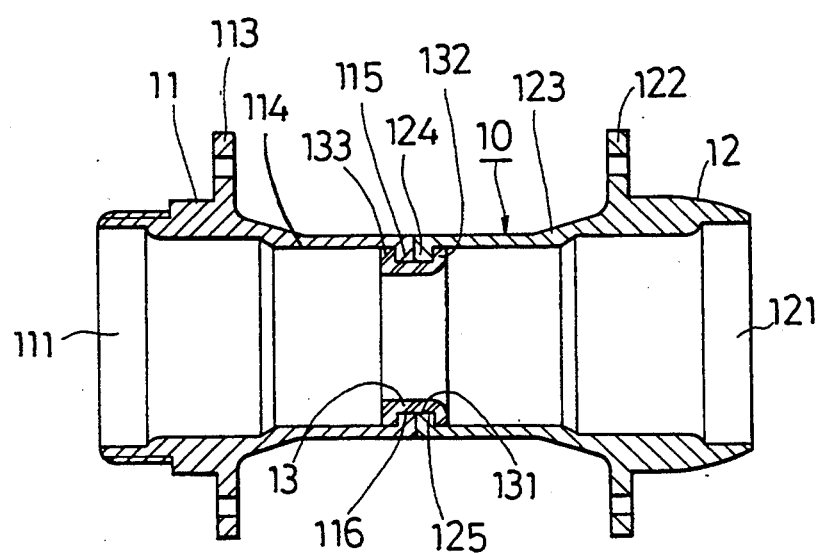
FIG. 5 shows a cross-sectional view of the bicycle hub shell according to the present invention.

Referring to FIGS. 3 and 5, the hub shell 10 is constituted by first and second pieces 11, 12. The first piece 11 confines an axial bore with a first axial end portion 111 and has an annular end portion 114 which is formed opposite to the first axial end portions 1 11 and which has a first annular flange 115 that extends inwardly and radially from the periphery of the annular end portion 114, and a first annular spoke-mounting flange 113 which is formed integrally on an external surface of the first piece 11. The second piece 12 confines an axial bore and has an axial end portion 121 and an annular end portion 123 opposite to the axial end portion and which is provided with a second annular flange that 124 extends inwardly and radially from the periphery of the annular end portion 123, and a second annular spoke-mounting flange 122 which is formed integrally on an external surface of the second piece 12. The annular end portions 114, 123 of the first and second pieces 11, 12 are disposed abuttingly side by side in order to align the axial bores of the same. The tubular connector 13 has an outwardly and radially extending flange 132 at one end thereof, and is disposed entirely within the pieces 11, 12 such that the flange 132 of the tubular connector 13 engages the first annular flange 115 of the first piece 11. The end portion 133 of the tubular connector 13 is pressed outwardly radially in order to form a flange 132 that cooperates with the flange 132 so as to clamp the first and second annular flange 115, 124 of the first and second pieces 11, 12 therebetween, thereby completing the assembly of the hub shell 10 of the present invention.

Figure 4:
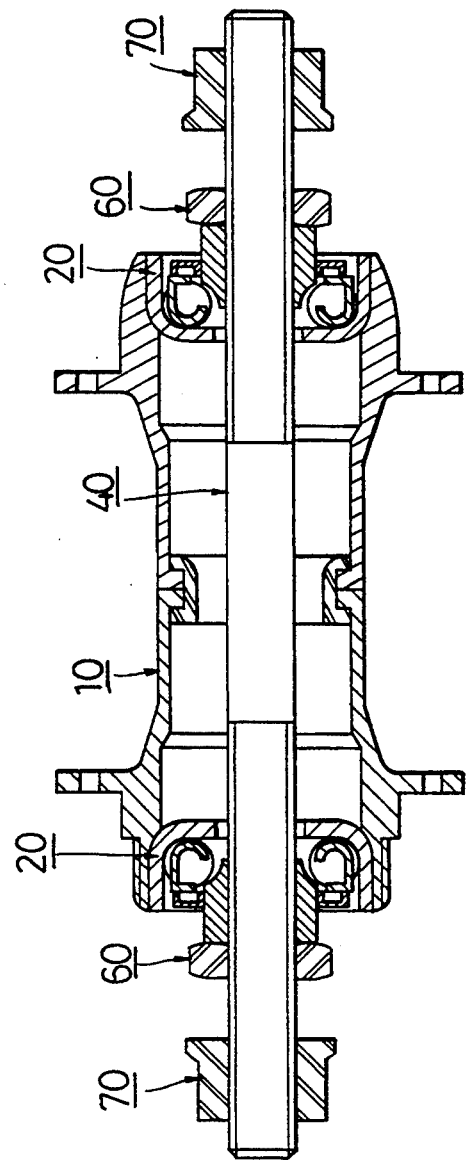
FIG. 4 illustrates a cross sectional view of the bicycle hub unit with the bicycle hub shell according to the present invention.

The mounting shaft 40 is inserted through the hub shell 10, while the bearing assemblies 20 are respectively disposed in the first and second axial end portions 111, 121 of the axial bore and around the mounting shaft 40. The bearing mounting nuts 60 are mounted in the first and second end portions of the first and second pieces 11, 12 around the mounting shaft 40 in order to retain the bearing assemblies 20 therein such that the latter permits rotation of the hub shell 10 relative to the mounting shaft 40. The locking nuts 70 are mounted threadedly on two threaded end portions of the mounting shaft 40 in order to prevent the hub shell 10 of the present invention from disengaging a bicycle wheel (not shown), as illustrated in FIG. 4. The annular flanges 115, 124 of the first and second pieces 11, 12 have knurled inner surfaces, while the tubular connector 13 has a knurled outer surface 131 to generate friction among the pieces 11, 12 and the tubular connector 13 to prevent disengagement of the pieces 11, 12.

Note that the spoke-mounting flanges 113, 123 are formed integrally with the external surfaces of the first and second pieces 11, 12. Since the torque which is generated during use is opposite to the applied force and is disposed away from the tubular connector 13, the torque diminishes or decreases upon reaching the tubular connector 13. Thus, the hub shell 10 of the present invention can bear a greater torque as compared to the conventional bicycle hub shell.

With the invention thus explained, it is obvious to those skilled in the art that various modifications and variations can be made without departing from the scope and spirit of the present invention. It is therefore intended that the invention be limited as indicated in the appended claims.

I claim:

1. A bicycle hub shell confining an axial bore therethrough and which has a first axial end portion and a second axial end portion opposite to said first axial end portion, wherein the improvement comprises:

said hub shell having first and second annular mounting flanges formed integrally on an external surface thereof respectively adjacent to said first and second axial end portions, said hub shell being constituted by two pieces and a tubular connector interconnecting said two pieces, each of said pieces having an annular end portion which is formed opposite to a respective one of said first and second axial end portions and which has an annular flange that extends inwardly and radially from the periphery of said annular end portion and that abuts against said annular flange of said annular portion of another one of said pieces, said tubular connector being disposed entirely within said pieces and having two outwardly and radially extending flange portions which clamp said annular flanges of said pieces so as to interconnect said pieces.

2. The bicycle hub shell as defined in claim 1, wherein said annular flange has a knurled inner surface.

3. The bicycle hub shell as defined in claim 2, wherein said tubular connector has a knurled outer surface which abuts against said knurled inner surface of said annular flange.

* * * * *